US008332097B2

(12) United States Patent
Chiba et al.

(10) Patent No.: US 8,332,097 B2
(45) Date of Patent: Dec. 11, 2012

(54) METHOD OF DETECTING AN OBJECT NEAR A VEHICLE

(75) Inventors: Tanemichi Chiba, Novi, MI (US); Hiroto Uesaka, West Bloomfield, MI (US); Michael A. Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 1388 days.

(21) Appl. No.: 12/002,285

(22) Filed: Dec. 14, 2007

(65) Prior Publication Data

US 2009/0157268 A1 Jun. 18, 2009

(51) Int. Cl.
*G06F 7/00* (2006.01)

(52) U.S. Cl. .......................................... 701/36; 348/148

(58) Field of Classification Search .................... 701/53, 701/70, 29.1, 29.6, 30.5, 30.8, 31.4, 36; 348/148
See application file for complete search history.

(56) References Cited

U.S. PATENT DOCUMENTS 5,742,699 A * 4/1998 Adkins et al. ................. 382/107
2004/0204807 A1* 10/2004 Kimura et al. .................. 701/36
2008/0100709 A1* 5/2008 Furukawa ..................... 348/169
2009/0055046 A1* 2/2009 Harumoto et al. .............. 701/36
2009/0157268 A1* 6/2009 Chiba et al. ..................... 701/53
2010/0002081 A1* 1/2010 Pawlicki et al. .............. 348/148
2010/0053327 A1* 3/2010 Nakayama et al. ........... 348/148
2010/0128128 A1* 5/2010 Nagamine et al. ............ 348/148
2010/0228435 A1* 9/2010 Higgins-Luthman ........... 701/36

* cited by examiner

*Primary Examiner* — John Q. Nguyen
*Assistant Examiner* — Michael Ng
(74) *Attorney, Agent, or Firm* — Harness, Dickey & Pierce, P.L.C.

(57) ABSTRACT

A method of detecting an object in or near a path of a vehicle utilizes object detection and warning system, including one or more cameras mounted to the vehicle. The method includes taking a first image with a camera when the vehicle is operated in a first predetermined manner, taking a second image with the camera when the vehicle is operated in a second predetermined manner, comparing the second image with the first image, and operating the system based on the compared first and second images. The method may further include storing a plurality of first images in a memory and comparing the second image with one of the first images stored in the memory. The method may further include alerting a vehicle driver when the object is detected, disabling the vehicle and then enabling the vehicle when no object is in a potential path of the vehicle.

19 Claims, 3 Drawing Sheets

METHOD OF DETECTING AN OBJECT NEAR A VEHICLE

FIELD

The present disclosure relates to a detection and warning system for a vehicle and, more particularly, a method for detecting objects located near the vehicle and for alerting the driver when the objects are detected.

BACKGROUND

The statements in this section merely provide background information related to the present disclosure and may not constitute prior art. Some modern vehicles are equipped with a safety system that may provide feedback to a driver when an object is in a path or is near a path of the vehicle. These systems may be particularly useful when the driver intends to operate the vehicle in a reverse direction, in which case the driver's vision may be limited or obstructed by an exterior object or the vehicle itself. One example of such a system is a video camera mounted to the rear of a vehicle to provide real-time video images to a monitor disposed in a passenger compartment of the vehicle. Unfortunately, this type of system requires the driver to spend a certain elevated level of time to concentrate on and evaluate the entire image displayed on the monitor and then determine if any objects are in or near the vehicle path. This level of driver attention may cause the driver to over-focus on the displayed image in order to analyze the image thereby ignoring other conditions around the vehicle. Alternatively, the driver may misinterpret the image and ignore or not detect objects in or near the vehicle path. Accordingly, a system that automatically detects objects encroaching upon the vehicle path to rapidly focus the driver's attention to the encroaching object is desirable.

SUMMARY

A method of detecting an object near a path of a vehicle that has an object detection and warning system, including a camera mounted to the vehicle, may include: taking a first image with the camera when the vehicle is operated in a first predetermined manner; taking a second image with the camera when the vehicle is operated in a second predetermined manner; comparing the second image with the first image and operating the system based on the compared first and second images. The method may further include storing a plurality of first images in a memory and comparing the second image with one of the first images stored in the memory. Furthermore, the method may further include alerting a driver of the vehicle when an object is detected.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3A:
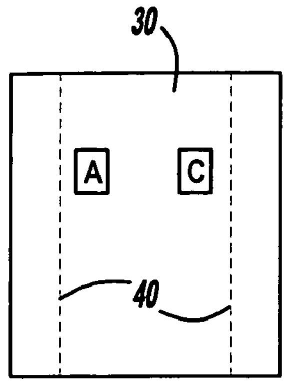
Figure 3B:
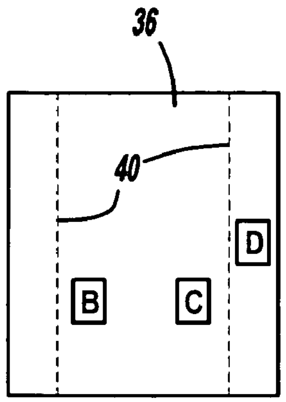
Figure 3C:
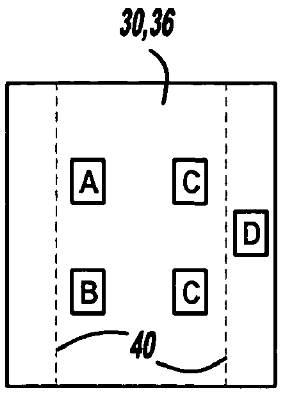

FIG. 3*a* is a schematic representation of a first baseline image captured in accordance with the teachings of the present disclosure;

FIG. 3*b* is a schematic representation of a first current image captured in accordance with the teachings of the present disclosure;

FIG. 3*c* is a schematic representation of the image of FIG. 3*a* overlaid with the image of FIG. 3*b;*

Figure 4A:
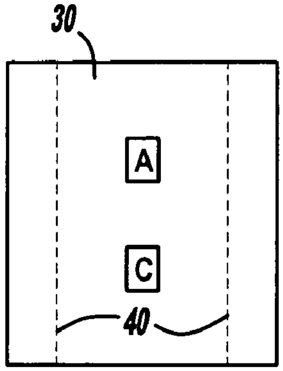
Figure 4B:
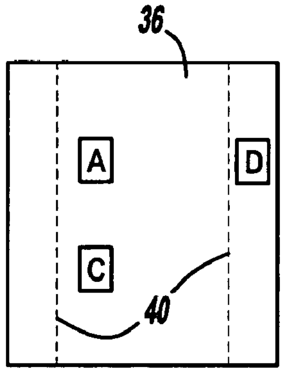
Figure 4C:
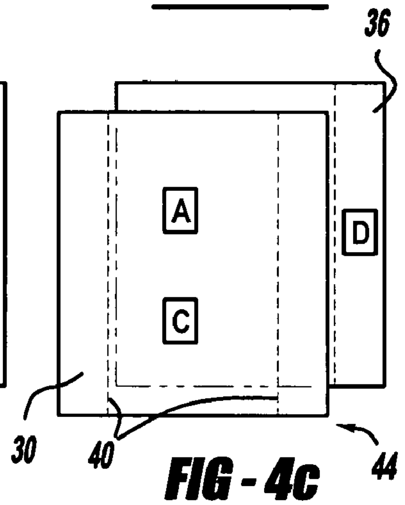

FIG. 4*a* is a schematic representation of a second baseline image;

FIG. 4*b* is a schematic representation of a second current image;

FIG. 4*c* is a schematic representation of the image of FIG. 4*a* overlaid with the image of FIG. 4*b;*

Figure 5A:
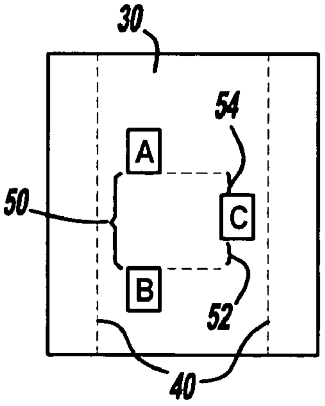
Figure 5B:
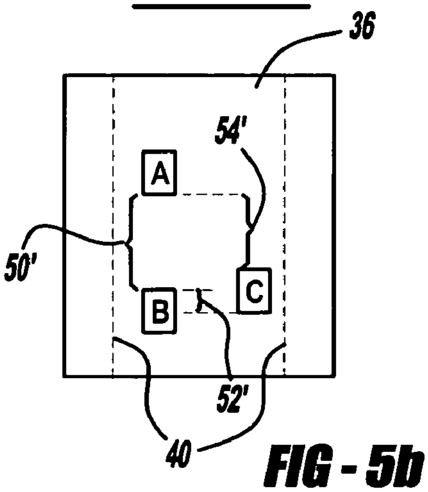

FIG. 5*a* is a schematic representation of a third baseline image;

FIG. 5*b* is a schematic representation of a third current image; and

Figure 1:
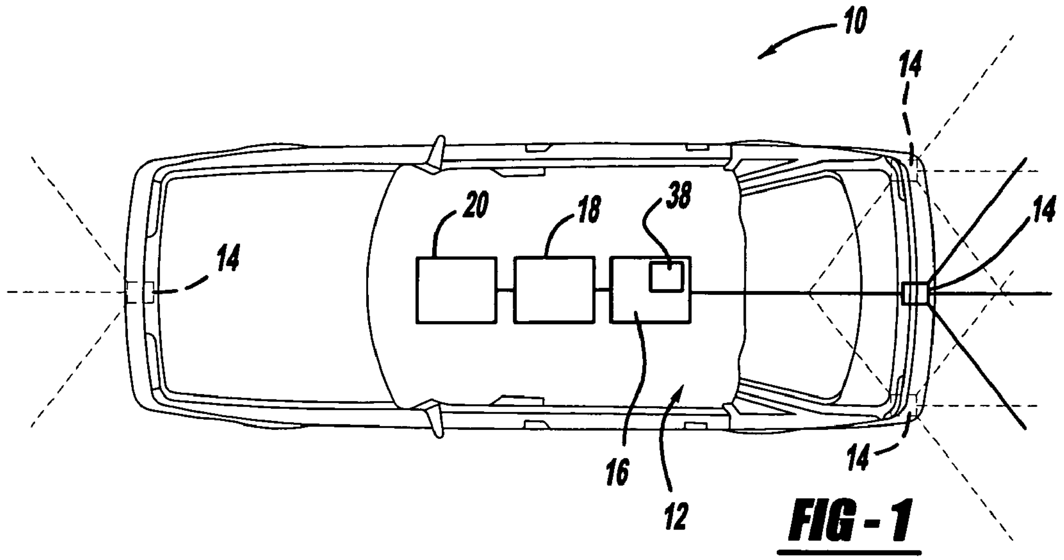
FIG. 1 is a top view of a vehicle having an object detection and alarm system in accordance with the teachings of the present disclosure.
Figure 6:
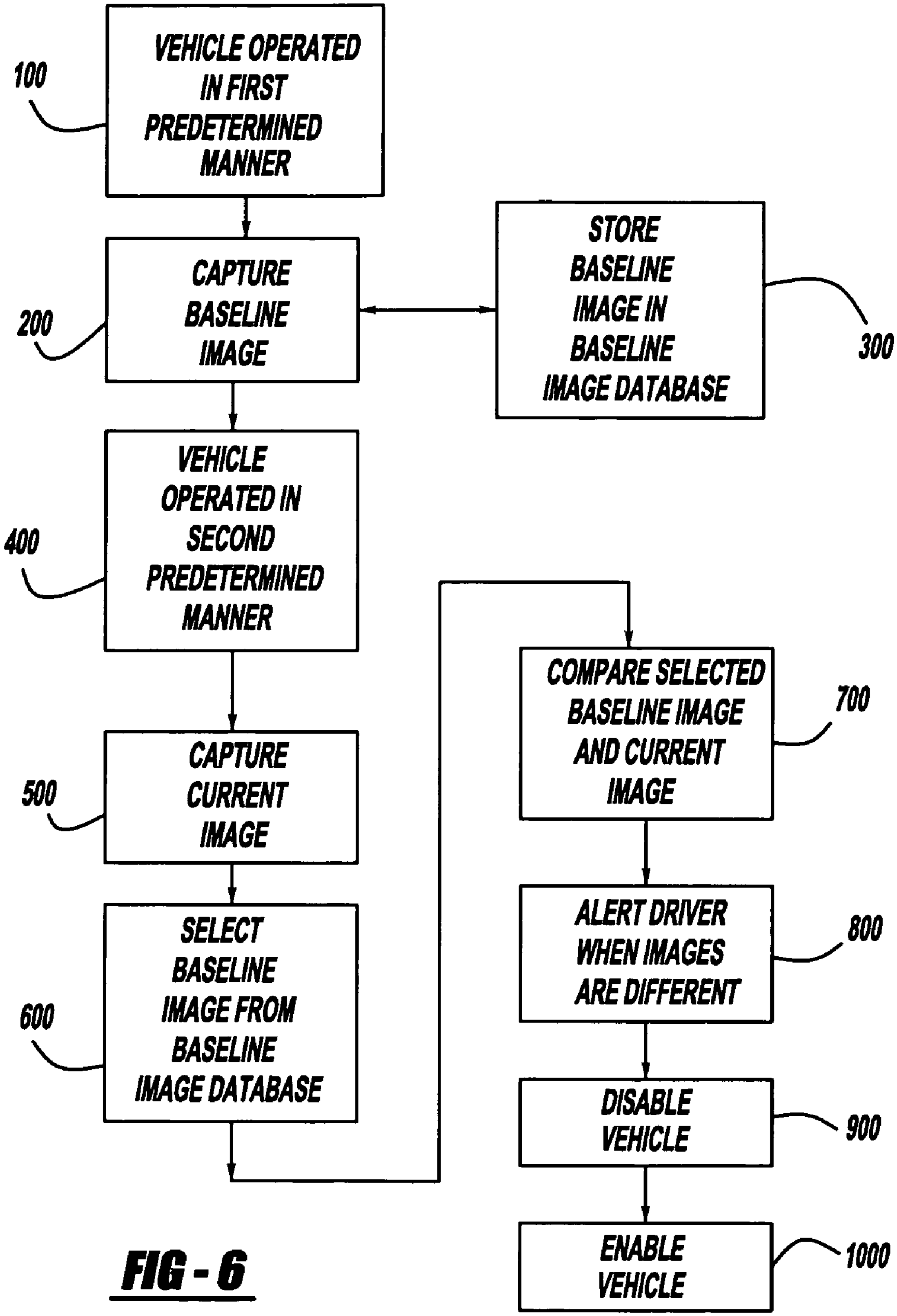

FIG. 6 is a flow chart illustrating a possible operation flow of the object detection and alarm system of FIG. 1.

DETAILED DESCRIPTION

Figure 2:
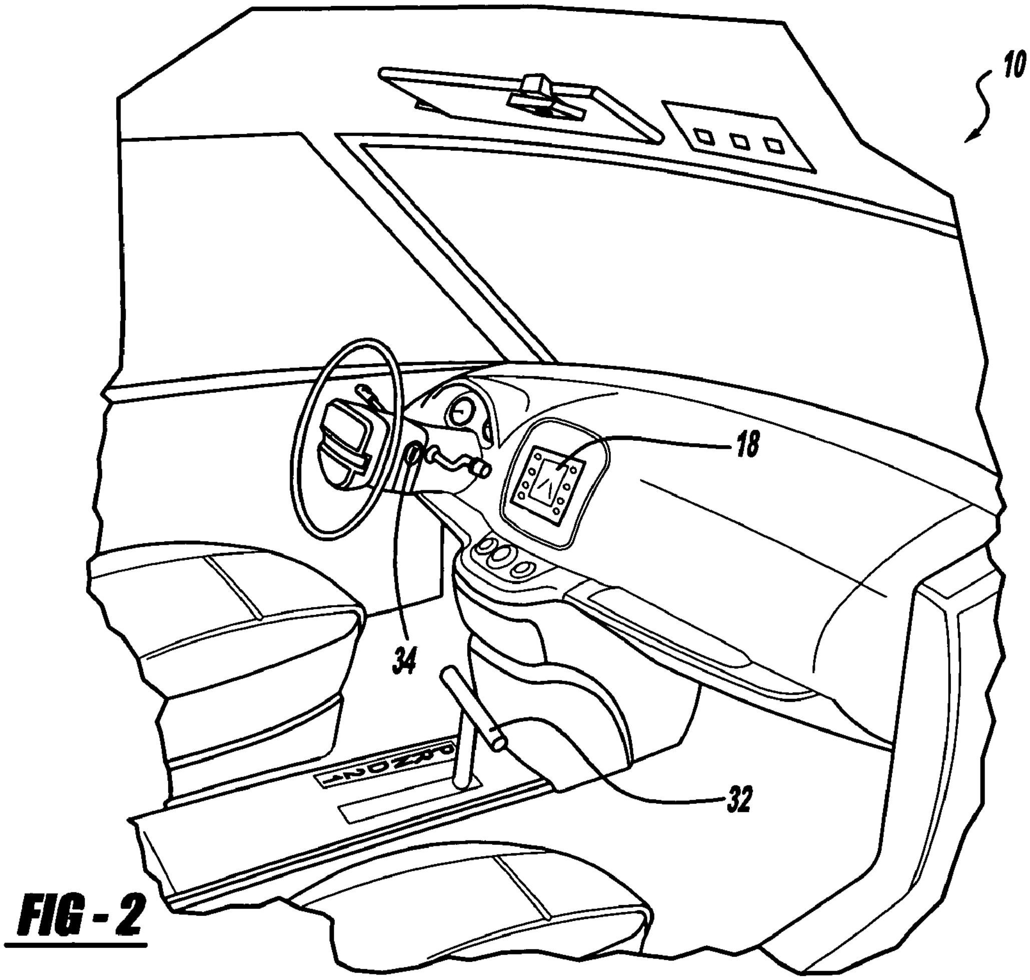
FIG. 2 is a partial perspective interior view of the vehicle of FIG. 1.

The following description is merely exemplary in nature and is not intended to limit the present disclosure, application, or uses. With reference first to FIGS. 1 and 2, a vehicle 10 is shown having an object detecting and warning system 12 that may communicate with other vehicle systems under certain predetermined conditions of the vehicle to operate the system 12 and the vehicle 10 in a particular manner. An object detecting portion of the system 12 may include a camera 14 and an electronic control unit (ECU) 16 for receiving and evaluating images taken from the camera 14. A warning portion of the system 12 may include only one of either a monitor 18 or an audio system 20, or both, the monitor 18 and the audio system 20, that may communicate with the ECU 16 and may, in predetermined circumstances, alert the driver that an object is detected within a viewing area the camera 14.

A camera 14 may be mounted to and directed away from the vehicle 10 to capture images of the general area immediately behind the vehicle 10. Still yet, the camera 14 may be mounted to capture images beyond the area immediately behind the vehicle 10. Still yet, the camera 14 may be preferably orientated to capture images in areas surrounding the vehicle 10 that may be difficult for the driver to see, such as those areas that are known as "blind spots," when the driver is inside the vehicle 10 an in a driver's position. For example, the camera 14 may be mounted near or at a rear of the vehicle, or near or at a front of the vehicle 10, and be directed to capture images that may or may not be obscured by a trunk, tailgate, hood, body panel, vertical pillar, etc. of the vehicle 10. Additionally, multiple cameras 14 may be disposed around a periphery of the vehicle 10 to capture images simultaneously from multiple areas around the vehicle 10.

The camera 14 may be a still photography camera, such as a digital image type camera, operable to selectively capture digital images. Examples of digital image file types include JPEG (Joint Photographic Experts Group), TIFF (Tag Image File Format), and GIF (Graphic Interchange Format), but others may be utilized and the preceding list is only for exemplary purposes. Additionally or alternatively, the camera 14, may be a digital video camera to be used to capture a continuous digital movie. Examples of digital video file types include mpeg1, mpeg2, mpeg4, which are "moving pictures expert group" formats, Quick Time® and AVI (Audio/video Interleaved). Other digital video file types may be utilized and the preceding list is only for exemplary purposes. Continuing, the captured images may be gray-scale images or color images; however, while the above examples denote traditional photographic cameras, it should be appreciated that the camera 14 may be any type of camera 14, such as an infrared camera or a night-vision camera, while the captured images may be any type of images, such as infrared images, electromagnetic images, or thermal images, that can differentiate objects captured therein.

With additional reference to FIG. 6, the camera 14 may capture a first image, or baseline image 30, when the driver operates a vehicle 10 in a manner generally consistent with stopping or parking the vehicle 10, such as operating the vehicle 10 at a low speed (i.e., about one or two miles per hour), engaging the vehicle brakes to maintain the vehicle 10 at zero miles per hour (stopped), shifting a transmission 32 into park ("P"), and turning an ignition 34 to an off position. Alternatively, the driver may selectively activate the camera 14 to capture the baseline image 30 regardless of the current condition of the vehicle 10.

The camera 14 may capture a second image, or current image 36, when the driver operates the vehicle 10 in a manner generally consistent with moving the vehicle 10 forward or backward. Examples of manners generally consistent with moving the vehicle forward or backward may be: releasing the vehicle brakes in order to permit the vehicle to move, actuating the brakes in order to shift the transmission 32 out of park or "P", shifting the transmission 32, turning the ignition 34 to an on position, and accelerating the vehicle 10, such as stepping on an accelerator pedal to move the vehicle forward or backward.

The ECU 16 may communicate with and receive the baseline and current images 30, 36 from the camera 14 and may include a memory 38 for storing the received images 30, 36. The ECU 16 may digitally overlay the received images 30, 36 and determine differences between the images 30, 36, such as differences in color or shading. Furthermore, the ECU 16 may evaluate these differences to detect objects that appear in the current image 36 but not in the baseline image 30, or to detect objects common to both images 30, 36 that have changed position. Objects detected in this manner will hereinafter be referred to as "encroaching objects." The ECU 16 may further determine if at least one encroaching object is within the path, also known as the potential path, of the vehicle 10. The ECU 16 may communicate with either or both of the monitor 18 and the audio alarm 20 to alert the driver when an encroaching object is detected. While the ECU 16 has been described as using color or shading differences to compare and evaluate the images, it should be appreciated that the particular method described for comparing the baseline and current images 30, 36 is but one manner of comparison regarding the present disclosure and that another method may be employed to detect differences between similar images 30, 36 to achieve the benefits of the present disclosure.

By way of the example illustrated in the top views of FIGS. 3*a* and 3*b*, the baseline image 30 of FIG. 3*a* includes objects A and C, and the current image 36 of FIG. 3*b* includes objects B, C, and D. The parallel dashed lines 40 indicate a straight-line projected potential path of the vehicle 10 while the area between the lines depicts the area that the vehicle may occupy. The overlaid images 30, 36 of FIG. 3*c* include objects A, B, C, and D. The ECU 16, after overlaying and comparing the images 30, 36, may determine that object A is not in the current image 36, that object B is not in the baseline image 30, and that object C is in both images 30, 36 but has changed position. The ECU 16 may then analyze each object to determine if each object is or is not an encroaching object. For example, the ECU 16 may determine that object A is not an encroaching object, as it does not exist in the current image 36, that objects B and D are encroaching objects, as they exist in the current image 36 but not the baseline image 30, and that object C is an encroaching object as it exists in both images 30, 36 but in a different position. Encroaching objects are objects that may be struck by the vehicle 10 when the vehicle is moved. Continuing, the ECU 16 may further determine that object D is not in the vehicle potential path and that objects B and C are in the vehicle potential path. The determination of whether an object is or is not in the vehicle path is determined by comparing the photo images, still or movie version, captured by the cameras 14 placed anywhere on and around the periphery of the vehicle 10. The ECU 16 may communicate with the monitor and the audio device to alert the driver as to the presence and condition (i.e., in the vehicle path or not in the vehicle path) of the encroaching objects B, C, and D.

The ECU 16 may falsely detect an encroaching object when comparing the current image 36 to the baseline image 30 without adjusting or manipulating the images to account for changes in the vehicle environment, such as light conditions or a position change of the camera 14 (i.e., camera drift), that may occur during the time lapse between capturing the baseline image 30 and the current image 36. The changed vehicle environment may create apparent differences between the images 30, 36, even though the objects and the positions of the objects have not changed. For example, the baseline image 30 captured in a garage and during the morning hours may include shadows, while the current image 36 captured in the garage at night may have fewer or different shadows. The differences in shadows between morning and night may be caused by differences in the intensity and angularity at which light impacts or is shown onto the vehicle 10 and any objects surrounding the vehicle. Accordingly, the baseline images 30 and current images 36 may appear to be different due to the different shadow patterns and/or intensities created by different light conditions. In another example, the baseline image 30 captured in the garage when the vehicle 10 is parked in one position may appear to be different than the current image 36 captured in the garage when the vehicle 10 is parked in a slightly different position. In either example, the ECU 16 may falsely identify the object as an encroaching object because of the seemingly different baseline and current images 30, 36.

The ECU 16 may automatically accommodate for different lighting conditions by comparing the current image 36 to the baseline image 30 that generally matches the lighting condition of the current image 36. The ECU 16 may automatically or selectively, by way of driver input, store baseline images 30 in the memory 38 to build a database of baseline images 30 in a variety of lighting conditions. The database may include a plurality of stored baseline images captured under different light conditions, and each of the stored baseline images 30 may be associated with a common location of the vehicle 10, like a garage or driveway. The ECU 16 may select the stored baseline image 30 that was captured during lighting conditions most similar to the lighting conditions of the current image 36, as captured with a camera 14, and may compare the current image 36 with the selected baseline image 30. The ECU 16 may select the most suitable stored baseline image 30 based on rules that incorporate one or several factors, such as light intensity, time of day, position and location of the vehicle 10, an age of the stored baseline image 30, and an elapsed time between capturing the images 30, 36.

By way of example, a baseline image 30 may be taken every time the vehicle 10 is parked or stopped in the garage and/or every time the driver selectively operates the camera 14 in the garage. Parking the vehicle 10 may entail placing the transmission 32 into "P", turning off the ignition 34, applying a vehicle parking/emergency brake, simply applying the vehicle wheel brakes and stopping forward or backward motion of the vehicle, whose engine is running, for a predetermined amount of time, etc. As the database of images associated with the garage grows, the memory 38 will include a variety of baseline images 30 taken at different times of the day and associated with a variety of lighting conditions, such as sunrise, midday, sunset, nighttime, etc. The ECU 16 may then select among all of the stored baseline images 30 associated with the garage.

While lighting has been described using various positions and/or conditions of the Sun, a situation may arise such that lighting may only be provided artificially, such as by electric interior garage lighting or electric exterior house, garage or driveway lighting, regardless of whether it is incandescent or fluorescent. Artificial lighting may be the only fashion in which lighting may be provided, such as at certain times of the day, such as when the sun is blocked by clouds, or the Sun is not shining at a particular time of day, because it is nighttime, when the Sun does not shine. In such cases, artificial lighting is treated similarly to, or exactly as, natural lighting regarding baseline images 30 and current images 36, their capture with cameras 14, storage in memory, and comparison.

As an alternative to or in conjunction with selecting a representative baseline image 30 from the memory 38, the ECU 16 may utilize a variety of filtering techniques to minimize differences between the images 30, 36 due to different light conditions. For example, a filter may be employed to recognize and eliminate shadow effects. In one fashion, shadow effects of a certain brightness, intensity or shade are eliminated or disregarded for comparison purposes. In another example, the filter may uniformly increase or decrease the color or shading of one of the images to recreate the image as it would have appeared in light conditions that are similar to the other or comparison image.

The ECU 16 may also automatically accommodate for camera drift that may occur after capturing the baseline image 30 and before capturing the current image 36. Camera drift may often occur when the ECU 16 selects a previously-stored baseline image 30 to compare with the current image 36, as the vehicle 10 and, therefore, the camera 14 may be in a slightly different position when the images 30, 36 are captured. For minor camera drift, the ECU 16 may digitally shift the current image 36 relative to the baseline image 30 and compare just an overlapping portion 44 of the images 30, 36 utilizing the previously disclosed methods illustrated in FIGS. 3*a*-3*c*. The amount of shifting that is permissible may be limited by the ECU 16 because large shifts may prevent the ECU from detecting the encroaching object that may appear entirely in the non-overlapping portions of the images.

By way of the example illustrated in FIGS. 4*a* and 4*b*, the baseline image 30 of FIG. 4*a* includes the objects A and C. The current image 36 of FIG. 4*b* includes the objects A, C, and D. The ECU 16 may shift and overlay the images 30, 36, as shown in FIG. 4*c*, and evaluate the overlapped portion 44 in the manner previously discussed, regarding objects, lighting etc. The ECU may then determine that objects A and C are in both the images 30, 36. The ECU may then determine that the objects A and C are not encroaching objects, as objects A and C are in both images 30, 36 and have not changed position relative to each other. The ECU might not detect potentially encroaching object D, however, as object D is not in the overlapping portion 44, and not in the vehicle path, denoted by lines 40.

Alternatively, the ECU 16 may account for camera drift by comparing relative positions of objects captured in the images 30, 36, as illustrated in FIGS. 5*a* and 5*b*. As an example, the ECU 16 may analyze the baseline image 30 of FIG. 5*a* and calculate or determine a relative distance 50 between an object A and an object B, a relative distance 52 between the object B and an object C, and a relative distance 54 between the object A and the object C. The ECU 16 may analyze the current image 36 of FIG. 5*b* and calculate a relative distance 50' between the object A and the object B, a relative distance 52' between the object B and the object C, and a relative distance 54' between the objects A and C. In this example, the relative distances 50, 50' are generally the same while the relative distances 52, 52' and 54, 54' are different, which may indicate that the objects A and B have not moved while the object C has moved relative to objects A and B.

The monitor 18 and the audio system 20 may cooperate, and act together, or act independently to alert the driver when any encroaching object has been detected by the ECU 16. The audio system 20 may emit an audible warning tone or beep, which may be a tone or a computer-generated "human" voice. Alternatively, the audio system may also provide explicit in regarding the presence and condition of the encroaching object by way of a computer-generated voice. The computer-generated voice may be particularly useful if the system 12 does not include the monitor 18, since the monitor shows a driver the exact location of the encroaching object.

The monitor 18 may receive the current image 36 from the ECU 16 and display the received current image 36. Any detected encroaching objects may be displayed on the monitor 18 in a manner that distinguishes them from the rest of the current image 36. For example, the encroaching objects may be highlighted in a highly visible color such as blue, yellow, orange, etc. for example, or may be set to blink or flash on the monitor 18, or may blink or flash in a highly visible color such as blue, yellow, orange, etc. A color generally associated with a warning or danger, such as red or yellow, may be preferred, but any color that quickly draws the attention of the driver to the monitored encroaching object may be suitable. Alternatively, the monitor 18 may monitor only the encroaching object.

The monitor 18 and the audio system 20 may also cooperate in various ways to provide a warning to the driver that is commensurate with the present condition of the encroaching object. For example, the monitor 18 may highlight the detected encroaching object whether or not the encroaching object is in the path or potential path of the vehicle 10. The encroaching objects that are within the vehicle path may be highlighted in one color, such as red, while objects that are not within the vehicle path may be highlighted in another color, such as yellow. For another example, encroaching objects that are within the vehicle path may blink, while objects that are not actually within the vehicle path may be highlighted, or vice-versa. In addition, the system 12 may enable or activate additional warning measures when the encroaching object is in the potential path of the vehicle 10, such as sounding the warning tone or activating the computer-generated voice. One can envision various additional ways in which the monitor, 18, ECU 16, and the audio system 20 may cooperate to alert the driver of the vehicle 10.

Continuing, the ECU 16 may communicate with other vehicle systems to disable the vehicle 10; that is, prevent the vehicle 10 from moving. Preferably, the system 12 only disables the vehicle 10 when the encroaching object is in the projected vehicle path or is moving toward the projected vehicle path. In examples of disabling the vehicle, the ECU 16 may lock the ignition 34 to prevent the vehicle 10 from being started or the steering wheel may be locked to prevent it from turning thereby discouraging driving of the vehicle.

Still yet, the transmission 32 may be prevented from being shifted into a drive mode if the object is detected in front of the vehicle 10; or into a reverse mode if the object is detected behind the vehicle 10, or into any mode altogether, from the transmission park position. The vehicle 10 may be disabled for a limited duration to allow the driver to visually inspect the area around the vehicle 10, until any encroaching objects are no longer detected by the ECU 16, or until the detection and warning system 12 is deactivated or overridden by the driver, such as by pressing a button to cancel the detection and warning system 12 or reset the system 12.

Although operative steps or processes of the invention have been discussed above, FIG. 6 generally depicts steps of such operative steps. Continuing, in block 100 a vehicle 10 may be operated in a first predetermined manner. Such predetermined manner may include the driver operating a vehicle 10 in a manner generally consistent with stopping or parking the vehicle 10, such as operating the vehicle 10 at a low speed (i.e., about one or two miles per hour), engaging the vehicle brakes to maintain the vehicle 10 at zero miles per hour (stopped), shifting a transmission 32 into park ("P"), and turning an ignition 34 to an off position. Alternatively, the driver may selectively activate the camera 14 to capture the baseline image 30 regardless of the current condition of the vehicle 10. Then, in block 200, a baseline image is captured by the camera 14. In block 300, the baseline image may be stored in a baseline image database within the ECU 16. The baseline image database may eventually then have numerous first or baseline images stored in it which may be used to compare to the second or current image. That is, if a vehicle is repeatedly parked in the same position or nearly the same position every evening, say in a garage or driveway, a stored first or baseline image may be used in the place of a newly taken first or baseline image.

In block 400, the vehicle is operated in a second predetermined manner. Such a second predetermined manner may include the driver operating the vehicle 10 in a manner generally consistent with moving the vehicle 10 forward or backward. Examples of manners generally consistent with moving the vehicle forward or backward may be: releasing the vehicle brakes in order to permit the vehicle to move, actuating the brakes in order to shift the transmission 32 out of park or "P", shifting the transmission 32, turning the ignition 34 to an "on" position, and/or accelerating the vehicle 10, such as stepping on an accelerator pedal to move the vehicle forward or backward. Then, in block 500, a current image or second image is captured by the camera to use in comparison to the first or baseline image. While a first, or baseline, image and second, or current, image may be captured by a single camera for comparison at a location on the vehicle, the teachings of the invention include multiple cameras located around the vehicle so that the process of taking a first and second image may be repeated for additional cameras around the vehicle 10, as depicted in FIG. 1.

In block 600, a baseline image from the baseline image database may be selected. The selection may be the baseline image most recently taken in block 200, or may be a different baseline image from the database. A baseline image may be selected from the baseline image database that has different image characteristics than that of the most recently taken baseline image. Such characteristics may be related to image brightness, less or different image shadows, or other characteristics. In block 700, the selected baseline image and the current image are compared, such as in a digital overlay fashion. For instance, the ECU 16 may evaluate these differences to detect objects that appear in the current image 36 but not in the baseline image 30, or to detect objects common to both images 30, 36 that have changed position. A more complete description of image comparison including "encroaching objects" is addressed above in more detail. Then, in block 800, a vehicle occupant, such as a driver, is alerted when the baseline or first image is different from the current or second image, as addressed above. Upon notification of the vehicle occupant, the vehicle is disabled, as noted in block 900, and then in block 1000, the vehicle is again enabled. The methods utilized in blocks 900 and 1000 are consistent with those described above related to vehicle disablement and enablement.

While the teachings of the invention have been described such that a first or baseline image 30 is compared to a second or current image 36, various ways to compare digital images for matches of objects or shapes between two images are known. One such type of system is utilized in human face recognition security software where two digital images are compared for similarities and/or differences. Comparison of two digital images using a similar system known in the arts, or another, such as a pixel comparison technique, that is known in the arts, may be used in conjunction with the present teachings to compare digital images.

Therefore, in accordance with the above description, various methods of detecting objects in the path of a vehicle are possible. For instance, a method of detecting an object in a path of a vehicle, the vehicle having an object detection and warning system including a camera mounted to take images external of the vehicle, may entail: taking a first image, such as a digital image, with a camera upon operating the vehicle in accordance with a first predetermined manner; taking a second image, such as a digital image, with the camera upon operating the vehicle in accordance with a second predetermined manner; comparing the second image with the first image; and operating the object detection and warning system after comparing the second image with the first image. Furthermore, the method may entail disabling the vehicle after operating the object detection and warning system such that operating the vehicle in accordance with a first predetermined manner consists of: shifting a vehicle transmission into park position, turning an ignition into an off position, or reaching a vehicle speed of zero.

The method may further entail operating the vehicle in accordance with a second predetermined manner consistent with: shifting a vehicle transmission from a park position; turning an ignition into an on position, or moving the vehicle in reverse at a speed greater than zero. The method may further entail, after taking a first image, storing the first image in a memory. Actually, the memory may include a database that contains a plurality or numerous "first images." That is, a database of first images, to which the second images may be compared to may be stored in memory. The stored first images may be considered to be "ideal" images that are not subject to drawbacks such as poor lighting, or colored marks, such as paint, on a garage floor or driveway. Additionally, the database of first images may be images taken of various lighting situations of the vehicle and its surrounding environment to which the second image may be compared.

Continuing, the method may entail comparing the first and second images such as comparing the second image to at least one of the plurality or numerous first images stored in the memory. Comparing the second image to the first image may entail comparing image shading (colors or shades of gray) of the images. Comparing the second image to the first image may include digitally overlaying the first image and the second image to determine differences with the images. Furthermore, the method may entail comparing the second image to the first image by determining a first relative position between objects captured in the first image and a second relative position between objects captured in the second image and comparing the first and second relative positions of the objects. If differences in object positions exist, then there is a difference in the images. Still yet, operating the object detection and warning system may further entail sounding an audible warning upon detecting a difference between the first and second images and displaying a visible warning in a different color on a monitor inside the vehicle.

In another operation scenario, the method of detecting an object in a path of a vehicle may entail: providing a camera to a vehicle for capturing images external to the vehicle; capturing a first image with the camera upon slowing the vehicle to less than two miles per hour; storing the first image in a memory; capturing a second image with the camera upon turning an ignition to an on position; comparing the second image with the first image; detecting an object in the second image that is in a path of the vehicle; and generating an audible and a visible warning on an in-vehicle monitor in response to detecting an object in the second image that is in a path of the vehicle. Slowing the vehicle to less than two miles per hour may further entail shifting the vehicle from a forward gear and/or applying the vehicle wheel brakes. A plurality of first images may be stored in the memory, that is, a number of images may be taken and stored to which the second image may be compared. Comparing the second image with the first image may entail comparing shading of the images while generating an audible and a visible warning further comprises indicating on a monitor a position of the detected object relative to a periphery of the vehicle.

Furthermore, a method of detecting an object in a path of a vehicle may entail providing a camera to a vehicle for capturing digital images external to the vehicle; capturing a first image with the camera upon stopping motion of the vehicle; storing the first image in a memory holding a plurality of different first images; capturing a second image with the camera upon turning an ignition to an on position; comparing the second image with the first image; determining a difference between the second image and the first image, wherein the difference is an object; determining that the object in the second image is in a path of the vehicle; and generating a visible warning of the object on an in-vehicle monitor in response to determining that the object in the second image is in a path of the vehicle. Generating a visible warning of the object may further entail displaying the object in color contrast to other displayed colors on the in-vehicle monitor. Generating a visible warning of the object may further entail displaying the object relative to a periphery of the vehicle and then disabling the engine of the vehicle, or in other words, preventing the vehicle engine from starting until some event occurs, such as turning off the detection system or acknowledging that an object as been detected in a position different from that of a first image used for comparison.

What is claimed is:

1. A method of detecting an object in a path of a vehicle, the vehicle having an object detection and warning system including a camera mounted to take images external of the vehicle, the method comprising:

taking a first image with a camera when a driver operates the vehicle in accordance with a first predetermined manner;

taking a second image with the camera only in response to the driver operating the vehicle in accordance with a second predetermined manner different than the first predetermined manner;

comparing the second image with the first image; and operating the object detection and warning system after comparing the second image with the first image.

2. The method of claim 1, wherein taking the first image further comprises storing the first image in a memory.

3. The method of claim 2, wherein the memory includes a database containing a plurality of first images.

4. The method of claim 3, wherein comparing the first and second images includes comparing the second image to at least one of the plurality of first images stored in the memory.

5. The method of claim 4, wherein comparing the second image to the first image further comprises comparing shading of the images.

6. The method of claim 5, wherein comparing the second image to the first image includes overlaying the first image and the second image.

7. The method of claim 5, wherein comparing the second image to the first image includes determining a first relative position between objects captured in the first image and a second relative position between objects captured in the second image and comparing the first and second relative positions of the objects.

8. The method of claim 1, further comprising disabling the vehicle after operating the object detection and warning system.

9. The method of claim 8, wherein operating the vehicle in the first predetermined manner includes: shifting a transmission of the vehicle into a park position, turning an ignition of the vehicle into an off position, or maintaining a vehicle speed of zero.

10. The method of claim 9, wherein operating the vehicle in the second predetermined manner includes: shifting the transmission of the vehicle from the park position, turning the ignition of the vehicle into an on position, or immediately after moving the vehicle.

11. The method of claim 1, wherein operating the object detection and warning system further comprises:

sounding an audible warning upon detecting a difference between the first and second image; and displaying a visible warning in a different color on a monitor.

12. The method of claim 1, wherein the capturing of the second image occurs when a transmission of the vehicle is shifted out of a park position.

13. A method of detecting an object in a path of a vehicle, the method comprising:

providing a camera to the vehicle for capturing digital images external to the vehicle;

capturing a first image with the camera upon stopping motion of the vehicle;

turning an ignition of the vehicle to an off position immediately after stopping the vehicle;

storing the first image in a memory holding a plurality of different first images;

capturing a second image with the camera upon the next turning of the ignition of the vehicle to an on position after the ignition of the vehicle was previously turned to the off position;

comparing the second image with the first image;

determining a difference between the second image and the first image based upon the comparison of the second image with the first image, wherein the difference is an object;

determining that the object in the second image is in a path of the vehicle; and generating a visible warning of the object on an in-vehicle monitor in response to determining that the object in the second image is in a path of the vehicle.

14. The method of claim 13, wherein generating the visible warning of the object further comprises displaying the object in color contrast to other displayed colors on an in-vehicle monitor.

15. The method of claim 14, wherein generating the visible warning of the object further comprises displaying the object relative to a periphery of the vehicle.

16. A method of detecting an object in a path of a vehicle, the method comprising:

providing a camera to the vehicle for capturing images external to the vehicle;

capturing a first image with the camera upon stopping the vehicle;

turning an ignition of the vehicle to an off position immediately after stopping the vehicle;

storing the first image in a memory;

capturing a second image with the camera upon the next turning an ignition an vehicle to an on position after the ignition of the vehicle was previously turned to the off position;

comparing the second image with the first image;

detecting an object in the second image that is in a path of the vehicle based upon the comparison of the second image with the first image; and generating an audible and a visible warning on an in-vehicle monitor in response to detecting the object in the second image that is in a path of the vehicle.

17. The method of claim 16, wherein a plurality of first images are stored in the memory.

18. The method of claim 16, wherein comparing the second image with the first image further comprises comparing shading of the images.

19. The method of claim 16, wherein generating the audible and the visible warning further comprises indicating on a monitor a position of the detected object relative to a periphery of the vehicle.

* * * * *

UNITED STATES PATENT AND TRADEMARK OFFICE

CERTIFICATE OF CORRECTION

PATENT NO. : 8,332,097 B2
APPLICATION NO. : 12/002285
DATED : December 11, 2012
INVENTOR(S) : Tanemichi Chiba et al.

It is certified that error appears in the above-identified patent and that said Letters Patent is hereby corrected as shown below:

Col. 11, line 17, claim 16, “an ignition an” should be
--of the ignition of the--

Signed and Sealed this
Twelfth Day of March, 2013

Teresa Stanek Rea
*Acting Director of the United States Patent and Trademark Office*